United States Patent [19]

Cooke

[11] Patent Number: 5,894,668
[45] Date of Patent: Apr. 13, 1999

[54] LADLE

[76] Inventor: Jeffrey A. Cooke, 339 W. Elmwood Pl., Minneapolis, Minn. 55419

[21] Appl. No.: 08/866,602

[22] Filed: May 30, 1997

[51] Int. Cl.⁶ ................................................. A47J 43/28
[52] U.S. Cl. ................................................. 30/324
[58] Field of Search .............................. 30/324–328, 147, 30/149, 150; D7/653, 662, 663

[56]  References Cited

U.S. PATENT DOCUMENTS

| | | | |
|---|---|---|---|
| 34,649 | 6/1901 | Herring. | |
| D. 147,459 | 9/1947 | Kloth. | |
| D. 271,656 | 12/1983 | Kanoui | D7/104 |
| 843,372 | 2/1907 | Smith | 30/324 |
| 3,208,144 | 9/1965 | Cronheim | 30/324 |
| 3,931,925 | 1/1976 | Ruff | 229/43 |
| 5,367,775 | 11/1994 | Tong et al. | 30/324 |

*Primary Examiner*—Douglas D. Watts
*Attorney, Agent, or Firm*—Nawrocki, Rooney & Sivertson, P.A.

[57]  ABSTRACT

A rear pouring ladle for pouring liquids, having a handle attached to a bowl. The handle includes a grip end, a shank and an attachment end. The bowl includes a concave wall and a rim which form a pouring portion for desired liquid flow. The attachment end of the handle is uniquely configured to position to the grip end of the handle proximal the pouring portion of the bowl, while providing unimpeded liquid flow from the bowl at the pouring portion.

18 Claims, 4 Drawing Sheets

LADLE

TECHNICAL FIELD

The present invention relates to a ladle for pouring liquid foods and drinks. More particularly, it relates to a ladle designed for unimpeded, ergonomic pouring.

BACKGROUND OF THE INVENTION

Ladles are common utensils used for serving various liquid foods, such as soup, stew, etc. and drinks. A standard ladle includes a handle attached at one end to a relatively large bowl. The bowl has a concave wall and a rim or edge. To facilitate pouring from the bowl, the rim normally defines a spout at a location about the edge. The handle, in turn, is attached to the bowl along its outer circumference approximately 90° from the spout.

During use, a user grasps the handle and dips the bowl into a liquid food or drink container. Once the bowl is filled to a desired level, the user, via the handle, transfers the ladle to a second receptacle, such as a cup or bowl. To dispense the liquid substance from the bowl, the spout is positioned over the receptacle such that, typically, the spout faces the user. The user begins by rotating his or her wrist to tip the spout downward. However, the human wrist allows for only a limited range of rotational movement in such a manner. This limited movement can prevent the user from emptying the ladle bowl solely by moving the wrist. Instead, once the limit is reached, the user must rotate and extend his or her arm and shoulder. Thus, the user is forced to awkwardly rotate his or her wrist, arm and shoulder to completely empty the contents of the ladle bowl.

While the above-described standard ladle design is widely practiced, it is ergonomically unacceptable. Again, to dispense the liquid substance from the ladle bowl, the user's wrist, arm and shoulder must all be rotated. This unnatural motion is further complicated when the ladle is used in a partially shielded environment. For example, at many restaurant salad bars, a plastic shield or "sneeze guard" constricts the area available for manipulating the ladle when pouring salad dressings, soups, etc. The plastic shield basically prevents the user from performing the exaggerated arm and shoulder motion required by the standard ladle design.

While the standard ladle design is well accepted, it presents distinct ergonomic concerns never before addressed. The standard ladle design greatly impedes simpler pouring motions. Therefore, a need exists for a ladle designed for more convenient pouring.

SUMMARY OF THE INVENTION

The present invention provides a ladle configured to allow rearward pouring. The ladle includes a bowl and a handle. The bowl includes a concave wall and a rim, which defines a pouring portion. The handle includes a grip end, a shank and an attachment end. The attachment end is attached to the bowl such that the shank extends above the rim. More particularly, in the preferred embodiment, the attachment end is configured such that the grip end of the handle is proximal to the pouring portion of the rim. Finally, the attachment end is configured to provide unimpeded liquid flow from the pouring portion of the bowl. In the preferred embodiment, the pouring portion includes a spout.

During use, a user grasps the handle at the grip end. By manipulating the handle, the user dips the bowl into a liquid-containing container. After filling the bowl to a desired level, the user transfers the ladle, via the handle, to a desired receptacle. In this regard, the grip end is orientated proximal the user, whereas the bowl is distal, or away from, the user. Then, by simply rotating the grip end of the handle toward the user, liquid is allowed to flow from the bowl via the pouring portion. Notably, the direction of fluid flow passes under the shank, toward the grip end. Thus, in a preferred embodiment, the direction of fluid flow intersects an axis formed by the shank. Finally, as previously described, the attachment end is configured such that fluid flow from the pouring portion of the bowl is unimpeded.

DETAILED DESCRIPTION OF THE INVENTION

Figure 1:
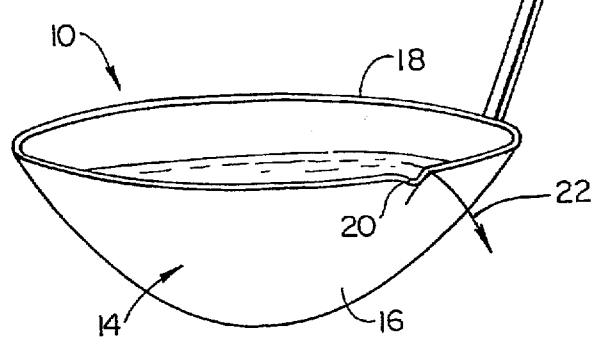
FIG. 1 is a perspective view of a prior art ladle.

FIG. 1 shows a prior art ladle 10. The ladle 10 includes a handle 12 and a bowl 14. The handle 12 is attached to, and outwardly and upwardly from a rim 18 of the bowl 14.

The bowl 14 is defined by a concave wall 16 which includes rim 18. Further, the rim 18 defines an intended pouring portion at 20. Pouring portion 20 establishes a fluid flow direction, illustrated by an arrow 22. Notably, the handle 12 is attached to the bowl 14 about the circumference of the rim 18 approximately 90° from the pouring portion 20.

Figure 2:
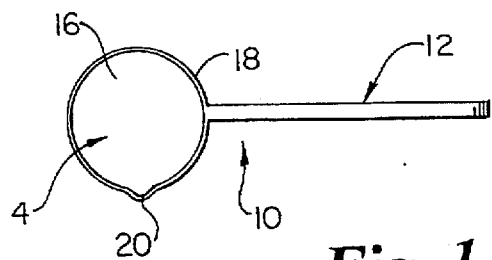
FIG. 2 is a top plan view of the prior art ladle of FIG. 1.

A user maneuvers the ladle 10 by grasping the handle 12 and first submerging the bowl 14 within a liquid-containing vessel (not shown in FIGS. 1 and 2). After filling the bowl 14 to a desired level, the ladle 10 is positioned above a receptacle vessel such as a cup or bowl. In particular, the pouring portion 20 of the bowl 14 is typically positioned proximate (or closest to) the user. Liquid substance is dispensed from the bowl 14 by tilting the handle 12, and thus the bowl 14, toward the user. This action causes the liquid substance to flow from the bowl 14 at the pouring portion 20, as indicated by the arrow 22.

FIG. 2 shows the prior art ladle 10 in top plan. The ladle 10 includes handle 12 and ladle bowl 14.

Figure 4:
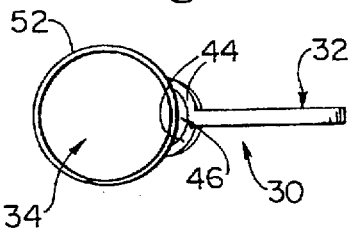
FIG. 4 is a top plan view of the ladle illustrated in FIG. 3.
Figure 3:
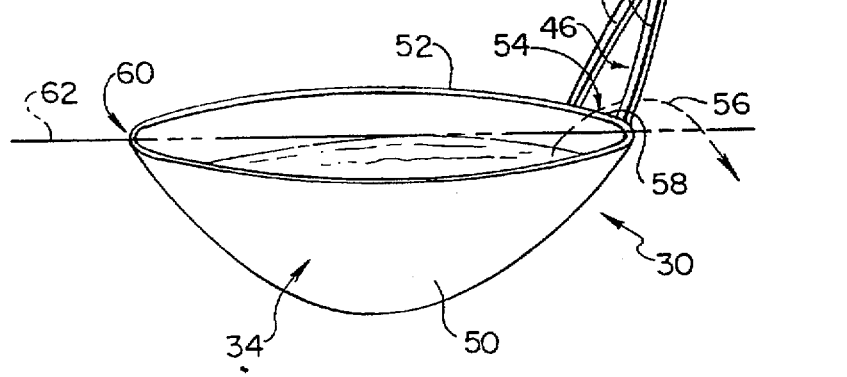
FIG. 3 is a perspective view of a ladle in accordance with the present invention.

FIGS. 3 and 4 illustrate a primary embodiment of a ladle 30 in accordance with the present invention. Ladle 30 includes a handle 32 and a bowl portion 34. Handle 32 is attached to, and extends upwardly and outwardly from, a rim 52 of the bowl portion 34.

The handle 32 includes a grip end 36, a shank 38 and an attachment end 40. The grip end 36 is shown as assuming a curved shape to receive a user's hand. The shank 38 extends from the grip end 36, terminating in the attachment end 40.

The shank 38 is preferably linear, defining a shank axis 41. Alternatively, the shank 38 can assume a variety of shapes, such as curvalinear, for aesthetic purposes.

The attachment end 40 is shown as being arch-shaped, having an apex 42 and opposing legs 44. The apex 42 and opposing legs 44 define a passage 46 which function as a spout. The opposing legs 44 are sufficiently spaced for attachment to the bowl 34, as described in greater detail below. Similarly, the passage 46 or spout is sized to provide fluid flow over rim 52 proximate the attachment end 40.

In the preferred embodiment, the grip end 36, the shank 38 and the attachment end 40 are integrally formed. Alternatively, however, the shank 38 and the attachment end 40 can be manufactured separately. In this regard, the attachment end 40 is attached to a distal end 48 of the shank 38.

The handle 32 can be made from stainless steel. However, other materials, such as plastic, wood, fine china, etc., may be equally acceptable.

The bowl 34 includes a concave wall 50 and rim 52. Further, the rim 52 defines a pouring portion 54 generally between legs 44 for desired liquid flow, as indicated by arrow 56. Pouring portion 54 defines a spout 58. Rim 52 also defines a front end 60, opposite the pouring portion 54. A flow direction axis 62 aligns the pouring portion 54 and the front end 60.

The bowl 34 can be manufactured from stainless steel. Alternatively, other materials are acceptable. Materials such as plastic, wood, fine china, etc. might be used. While the concave wall 50 can assume a generally elliptical form, other shapes are acceptable. For example, the concave wall 50 may be a hemisphere. Regardless of the form, however, the concave wall 50 is sized and shaped to maintain a volume of liquid.

The attachment end 40 of the handle 32 is attached to the bowl 34 as shown in FIGS. 3 and 4. More particularly, the opposing legs 44 are secured to the rim 52 of concave wall 50 generally straddling the pouring portion 54. In this regard, the attachment end 40 spaces the shank 38 from the rim 52. Further, the attachment end 40 is positioned such that a shank axis 41 intersects the flow direction axis 62 defined by the pouring portion 54 and the front end 60. In the preferred embodiment, the attachment end 40 of the handle 32 is configured such that the shank axis 41 extends upwardly from the pouring portion 54. The attachment end 40 is configured such that liquid flow (shown by the arrow 56) is generally unimpeded through the passage 46. The grip end 36, by way of the attachment end 40, is positioned, with respect to the bowl 34, generally near the pouring portion 54.

It should be noted that, when the bowl 34 assumes a hemispherical shape and does not include a spout, the pouring portion 54 and the front end 60 of the bowl 34 can be discerned solely by location of the grip end 36 of the handle 32 relative to the bowl 34. Unlike the standard ladle design (shown in FIG. 1 and FIG. 2), the pouring ladle 30 of the present invention positions the grip end 36 of the handle 32 proximal the pouring portion 54 of the bowl 34. Thus, with the handle 32 attached to the bowl 34, the grip end 36 effectively defines the pouring portion 54.

In an embodiment of the invention, the opposing legs 44 are spot-welded to the bowl 34. Other forms of securing the attachment end 40 to the bowl 34 are likewise acceptable. For example, the opposing legs 44 can be glued to the bowl 34. The concave wall 50 of the bowl 34 could also be configured to include slots (not shown) which might frictionally receive the opposing legs 44 of the attachment end 40.

Figure 7:
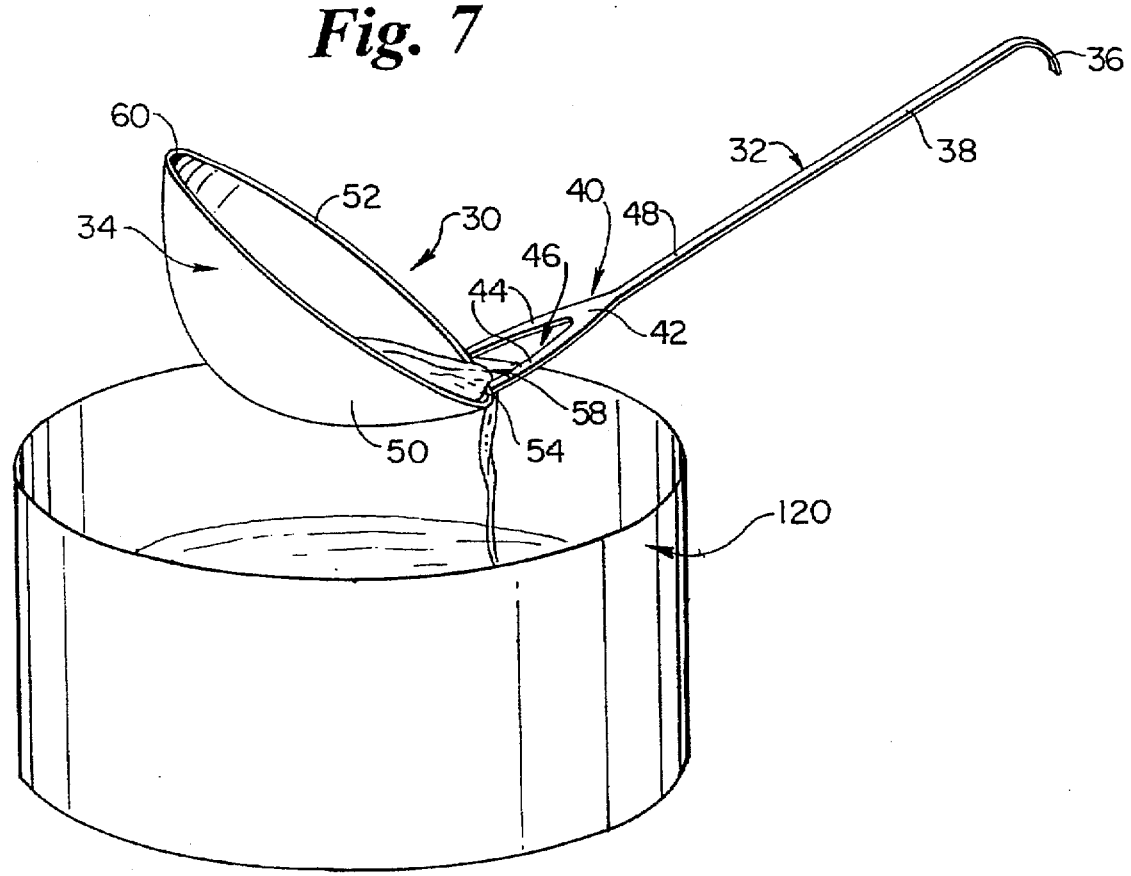
FIG. 7 is a perspective view illustrating the ladle in accordance with the present invention in operation.

The ladle 30 is used by first placing the grip end 36 of the handle 32 in a user's hand (not shown). By grasping the grip end 36, the user is able to maneuver the ladle 30 to desired locations. In this regard, the bowl 34 would be submerged in a liquid container (not shown). Once the bowl 34 is filled to a desired level, the user transfers the ladle to a receptacle vessel, such as a cup or receptacle bowl 120 as seen in FIG. 7. The user can position the ladle 30 over the receptacle bowl 120 such that the grip end 36 is proximate the user. The front end 60 of the bowl 34 would then be remote from the user. Liquid could then be dispensed from the bowl 34 by tilting the shank 38 such that the grip end 36 moves toward the user. This action tilts the bowl 34 such that the pouring portion 54 moves downward, whereas the front end 60 moves up. Liquid within the bowl 34 at the pouring portion 54 flows out of the bowl 34, in the direction of arrow 56. More particularly, the liquid flows in the direction of arrow 56 and passes through passage 46 in the attachment end 40. Attachment end 40, as previously discussed, is configured to provide unimpeded liquid flow from the pouring portion 54 of the bowl 34.

Figure 5:
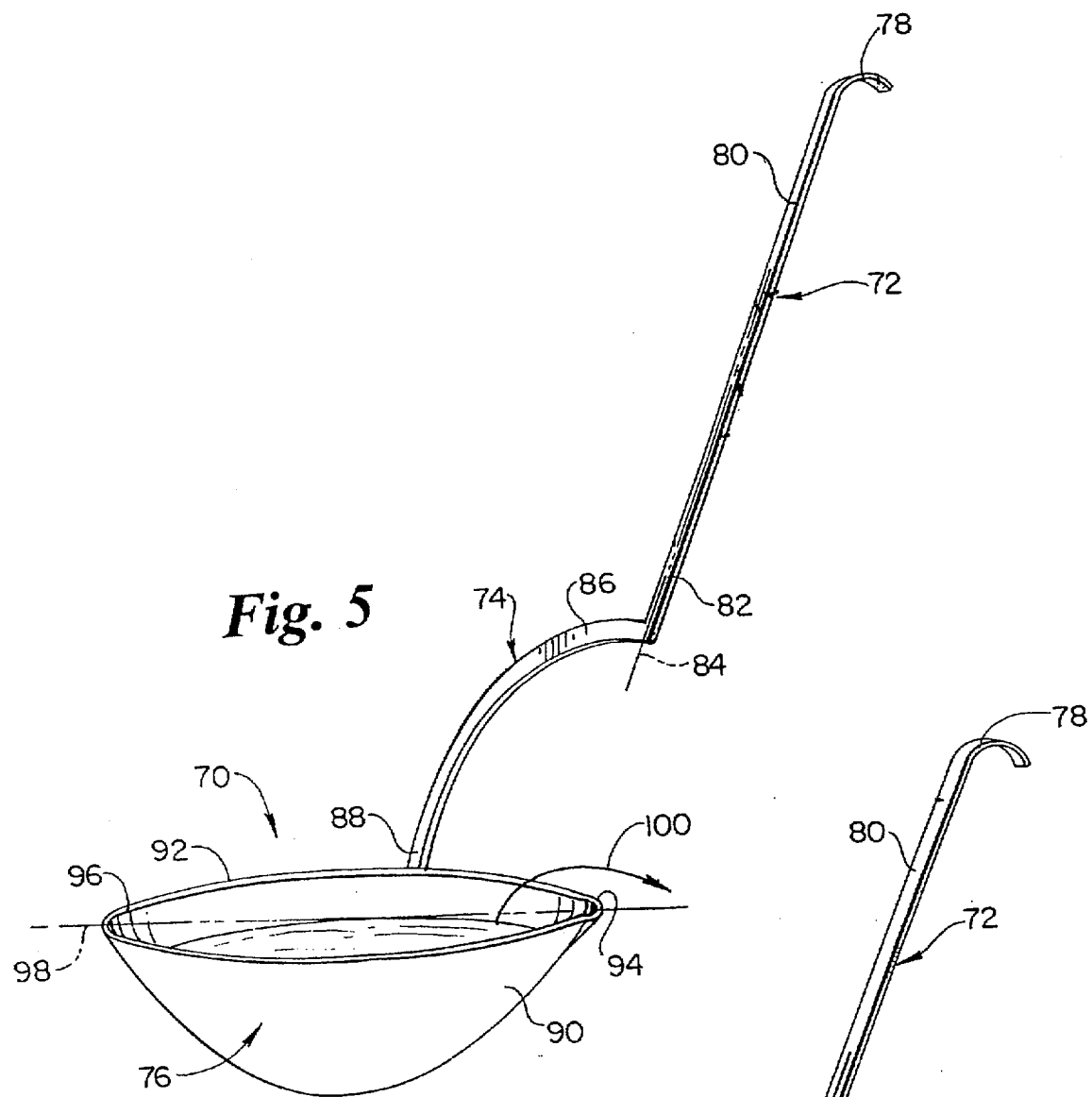
FIG. 5 is a perspective view of a first alternative embodiment of the ladle in accordance with the present invention.

FIG. 5 depicts an alternative embodiment of a ladle 70 in accordance with the present invention. The ladle 70 includes a handle 72, attachment means 74 and a bowl 76. The handle 72 is attached to the attachment means 74, which, in turn, is attached to the bowl 76.

The handle 72 includes a grip end 78, a shank 80 and a distal end 82. In the preferred embodiment, the handle 72 is integrally formed, and defines a shank axis 84.

Attachment means 74 is preferably an arcuate-shaped body having a first end 86 and a second end 88. Attachment means 74 is preferably made from a stiff material, such as stainless steel. First end 86 of attachment means 74 can be configured for attachment to the distal end 82 of the handle shank 80. Alternatively, the handle 72 and the attachment means 74 can be manufactured as a single body, such that the attachment means 74 is simply an extension of the distal end 82 of the handle 72.

The bowl 76 includes a concave wall 90 and a rim 92. Rim 92 has a spout 94 formed therein, and defines a front end 96 opposite the spout 94. The spout 94 and the front end 96 define a flow direction axis 98. An arrow 100 indicates a preferred direction of liquid flow from the bowl 76 through the spout 94.

As previously described, the attachment means 74 and the handle 72 could be manufactured as a single body. Regardless, the second end 88 of the attachment means 74 is connected to the rim 92 of the bowl 76 by spot welding, glue, etc. so that handle 72 extends upwardly and outwardly with respect to spout 94. The attachment means 74 spaces the distal end 82 of the handle 72 from the rim 92 of the bowl 76. The shank axis 84, as can be seen, intersects the flow direction axis 98. Further, the grip end 78 is positioned proximate the spout 94.

The ladle 70 functions similar to the ladle 30 shown in FIGS. 3 and 4. After filling the bowl 76 with liquid, the user positions the bowl 76 over a desired receptacle vessel. In particular, the ladle 70 is positioned such that the grip end 78 can be proximal the user, with the front end 96 of the bowl 76 being distal. Liquid is dispensed from the bowl 76 by tilting the grip end 78 generally toward the user. Fluid flows from the pouring portion 94 of the bowl 76 in a direction shown by the arrow 100. Attachment means 74 is configured such that fluid flow is unimpeded from the pouring portion 94.

Figure 6:
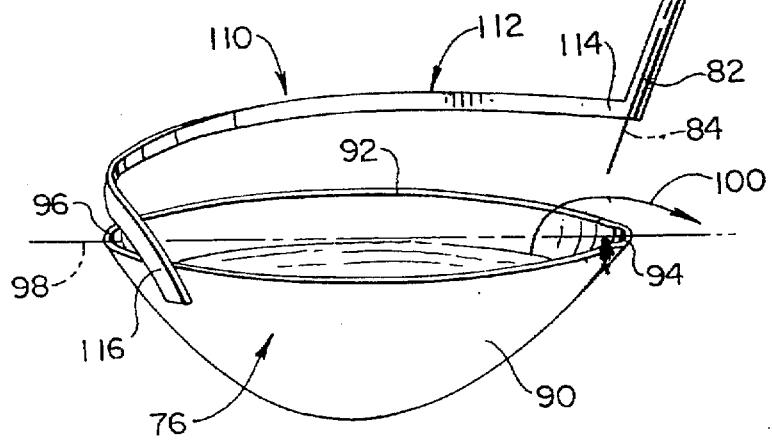
FIG. 6 is a perspective view of a second alternative embodiment of the ladle in accordance with the present invention.

FIG. 6 provides another alternative embodiment of the ladle 110 in accordance with the present invention. The ladle 110 is similar to the ladle 70 shown in FIG. 5 and includes handle 72, attachment means 112 and bowl 76. The attachment means 112 attaches the handle 72 to the bowl 76.

As previously described, the handle 72 includes a grip end 78, a shank 80 and a distal end 82. The shank 80 defines a shank axis 84. The attachment means 112 includes a first end 114 and a second end 116. In this embodiment, the attachment means 112 is a generally arcuate-shaped body having a laterally extending portion terminating at the first end 114. Similar to the ladle 70 shown in FIG. 5, the attachment means 112 of the ladle 110 can be manufactured as an integral portion of the handle 72. Alternatively, the attachment means 112 can be manufactured separately from the handle 72. Regardless, the attachment means 112 is preferably made of rigid material such as stainless steel.

The bowl 76 includes concave wall 90 and rim 92 thereof. Rim 92 has spout 94 formed therein, and it has front end 96 opposite spout 94. The spout 94 and the front end 96 define a flow direction axis 98. The spout 94 is designed to facilitate liquid flow along the arrow 100.

As previously described, the first end 114 of the attachment means 112 is attached to the distal end 82 of the handle 72. Further, the second end 116 of the attachment means 112 is attached to the rim 92 of bowl 76 at the front end 96. The attachment means 112 is configured to extend the handle 72 proximally from the spout 94. Attachment means 112 positions the handle 72 such that the shank axis 84 intersects the flow direction axis 98. Also, the grip end 78 of the handle 72 is proximate spout 94. However, the attachment means 112 is configured such that an unobstructed path is provided for the spout 94. In other words, the attachment means 112 extends from the front end 96 of the bowl 76 to a location proximate spout 94. Therefore, during use, unimpeded liquid flow is provided along the path 100.

In each of the embodiments defined hereinbefore, the handle is intended to extend upwardly and outwardly with respect to the rim of the ladle bowl, and the shank of the handle is intended to have an axis substantially aligned with the spout or portion of the rim defining the intended pouring portion. In order to render the improved ladle more ergonomically efficient, the angle at which the handle shank extends upwardly from a plane defined by a rim of the bowl is intended to be somewhere between 60° and 89°. It has been found that the optimum angle of extension is somewhere between 70° and 80°.

FIG. 7 illustrates the ladle embodiment of FIGS. 3 and 4 in use. As will be able to be seen in view of this disclosure, because of the construction of the ladle 30, the passage 46 defines a spout through which liquid in the bowl 34 passes readily in response to relatively minor rotation of the ladle in a clockwise direction, as viewed in FIG. 7. Desired ergonomic efficiency is, thereby, achieved.

Figure 8:
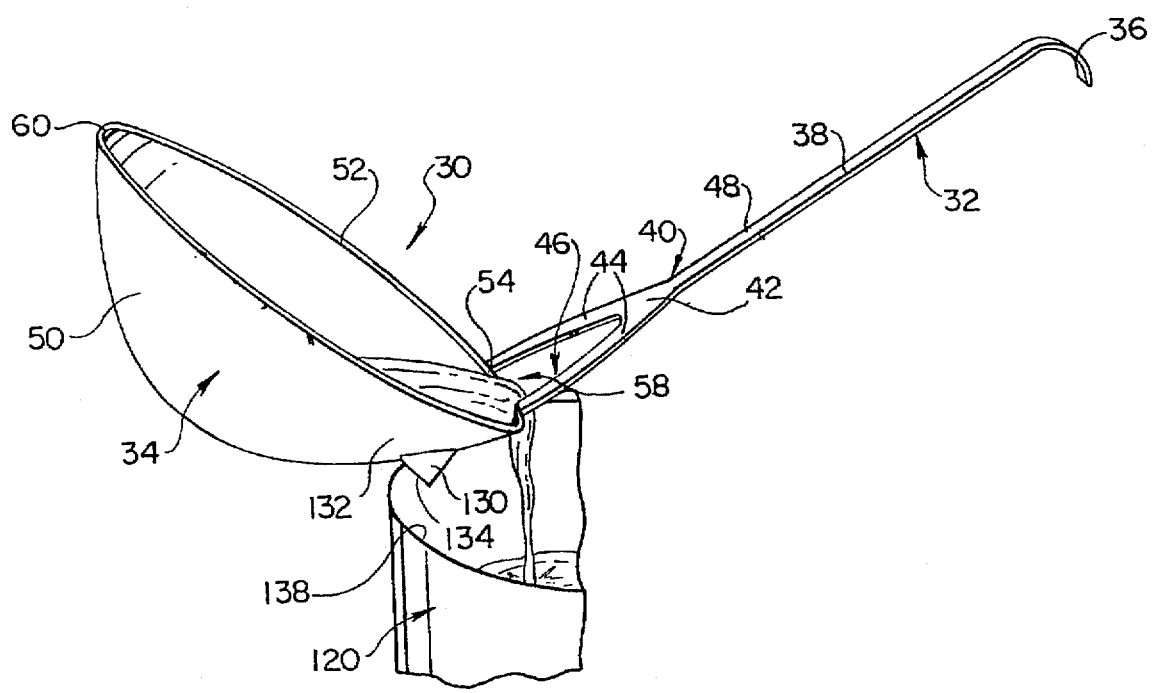
FIG. 8 is a perspective view illustrating a ladle in accordance with the present invention, having a recipient vessel engaging seat, in operation.

FIG. 8 illustrates the embodiment of the ladle 30 illustrated in FIGS. 3 and 4 having a seat 130 defined on the outer surface 132 of the ladle bowl 34. The seat 130 is shown as being positioned at a location slightly below the rim 52 and at a circumferential position substantially beneath the spout defined between legs 44. The seat 130 is provided with a shoulder 134 which faces generally downward. Consequently, when the user of the ladle 30 wishes to pour the contents of the ladle into a receiving vessel 120, the shoulder 134 of the seat 130 can be placed onto a rim 138 of the receiving receptacle 120. The user of the ladle 30 can then rotate the ladle in a direction as previously discussed in order to empty the contents thereof into the receiving vessel 120. As will be able to be seen in view of this disclosure, therefore, inadvertent spilling of the contents outside of the receiving vessel 120 can be avoided.

The ladle of the present invention overcomes the inefficient ergonomics associated with the standard ladle design. In particular, the rear pouring ladle of the present invention associates pouring of liquid substances from the ladle bowl solely by simple movement of the wrist of the user. The unique design of the attachment means or attachment end of the handle portion facilitates unimpeded flow from the rear portion of the bowl.

Although the present invention has been described with reference to preferred embodiments, workers skilled in the art will recognize that changes may be made in form and detail without departing from the spirit and scope of the invention. For example, the preferred ladle has been described as including a spout on the bowl. However, liquid can be poured from the rear portion of the ladle without a spout. Additionally, a variety of attachment means configurations can be incorporated, so long as unimpeded fluid flow is provided. For example, the attachment means may include a series of staggered legs attached to the bowl. Alternatively, the attachment means may be a part of the handle and extend in a substantially linear fashion from the front end of the bow. With this configuration, the grip end of the handle is positioned proximal the pouring portion in accordance with the preferred embodiment.

What is claimed is:

1. A ladle for pouring liquids, comprising:

a bowl having a concave wall and a rim including a pouring portion for intended liquid flow;

a handle having a proximal end, a shank and distal end; and attachment means comprising an arch-shaped member defined by opposing legs and an apex, said apex attached to the distal end of the handle and said opposing legs attached to the bowl such that the distal end of the handle is spaced from the rim of the bowl and the shank extends generally tangentially relative to the concave wall above the pouring portion, and wherein the attachment means is configured to provide unimpeded fluid flow from the pouring portion.

2. The ladle of claim 1, wherein the pouring portion includes a spout.

3. The ladle of claim 1, wherein the opposing legs is attached to the bowl in a spaced relationship, defining a passage adjacent the pouring portion of the rim.

4. The ladle of claim 1, wherein each of the opposing legs is proximal the pouring portion of the rim.

5. The ladle of claim 1, wherein the pouring portion includes a spout.

6. The ladle of claim 1, wherein the attachment means is configured to space the distal end of the handle from the rim.

7. A ladle for pouring liquid, comprising:

a bowl having a concave wall and a rim defining a plane, the rim including an intended pouring portion for flow of liquid within the bowl thereover;

a handle aligned along an axis generally intersecting the intended pouring portion and maintained rigidly at a defined angle relative to the plane defined by the rim of the bowl; and attachment means connecting the handle to the bowl with the intended pouring portion unobstructed;

wherein the defined angle of the handle relative to the bowl is such so as to facilitate emptying liquid in the bowl by a supinate motion.

8. The ladle of claim 7, wherein the handle diverges radially outwardly at a circumferential location about the rim proximate the intended pouring portion.

9. The ladle of claim 8, wherein the defined angle of the handle relative to the plane defined by the rim of the bowl is within a range between 66° and 89°.

10. The ladle of claim 9, wherein the defined angle of the handle relative to the plane defined by the rim of the bowl is within a range between 70° and 85°.

11. A ladle for pouring liquids, comprising:

a bowl having a concave wall and a rim including a pouring portion for intended liquid flow;

a handle having a proximal end, a shank and a distal end;

attachment means having a first end attached to the distal end of the handle and a second end attached to the bowl such that the distal end of the handle is spaced from the rim of the bowl and the shank extends generally tangentially relative to the concave wall above the pouring portion, and wherein the attachment means is configured to provide unimpeded fluid flow from the pouring portion; and a seat formed on an outer surface of said bowl downwardly from said rim and generally beneath said pouring portion, said seat having a downwardly facing shoulder engagable with a rim of a vessel intended to receive liquid from the ladle.

12. The ladle of claim 7, wherein the pouring portion of the rim defines a spout.

13. The ladle of claim 7, wherein the attachment means is an arch-shaped member including opposing legs and an apex, wherein the opposing legs are attached to the bowl and the apex is attached to the handle.

14. The ladle of claim 13, wherein the opposing legs are attached to the bowl in a spaced relationship, defining a passage adjacent the pouring portion of the rim.

15. The ladle of claim 13, wherein each of the opposing legs are proximal the pouring portion of the rim.

16. The ladle of claim 7, wherein the attachment means is an arcuate-shaped member having a first end and a second end, wherein the first end is attached to the handle and the second end is attached to the bowl.

17. The ladle of claim 16, wherein the second end of the arcuate-shaped member is attached to the rim adjacent but circumferentially offset from the pouring portion.

18. The ladle of claim 16, wherein the second end of the arcuate-shaped member is attached to the rim opposite the pouring portion.

* * * * *